United States Patent
Cho et al.

(10) Patent No.: US 8,660,566 B2
(45) Date of Patent: Feb. 25, 2014

(54) UL FFR-BASED SIGNAL TRANSMISSION METHOD

(75) Inventors: Han Gyu Cho, Anyang-si (KR); Wook Bong Lee, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/393,214

(22) PCT Filed: Aug. 24, 2010

(86) PCT No.: PCT/KR2010/005616
§ 371 (c)(1),
(2), (4) Date: Feb. 28, 2012

(87) PCT Pub. No.: WO2011/025208
PCT Pub. Date: Mar. 3, 2011

(65) Prior Publication Data
US 2012/0157155 A1    Jun. 21, 2012

Related U.S. Application Data

(60) Provisional application No. 61/310,291, filed on Mar. 4, 2010, provisional application No. 61/239,010, filed on Sep. 1, 2009, provisional application No. 61/237,703, filed on Aug. 28, 2009.

(30) Foreign Application Priority Data

Aug. 23, 2010  (KR) .................. 10-2010-0081371

(51) Int. Cl.
H04W 40/00    (2009.01)
H04W 72/00    (2009.01)
H04B 7/00    (2006.01)

(52) U.S. Cl.
USPC ..................... 455/447; 455/450; 455/522

(58) Field of Classification Search
USPC ........... 455/446, 447, 450, 451, 452.1, 452.2, 455/517, 522, 524
See application file for complete search history.

(56) References Cited

U.S. PATENT DOCUMENTS

| | | | | |
|---|---|---|---|---|
| 7,835,750 | B2 * | 11/2010 | Khan | 455/447 |
| 8,126,495 | B2 * | 2/2012 | Wu et al. | 455/522 |
| 2005/0074030 | A1 * | 4/2005 | Cho et al. | 370/474 |
| 2006/0014542 | A1 * | 1/2006 | Khandekar et al. | 455/442 |
| 2006/0234715 | A1 * | 10/2006 | Cho et al. | 455/447 |
| 2008/0274745 | A1 * | 11/2008 | Barak et al. | 455/447 |
| 2009/0003266 | A1 * | 1/2009 | Stolyar et al. | 370/328 |
| 2009/0047971 | A1 * | 2/2009 | Fu | 455/450 |

(Continued)

FOREIGN PATENT DOCUMENTS

| | | | |
|---|---|---|---|
| KR | 10-2008-0047021 | 5/2008 | |
| KR | 10-2009-0085504 | 8/2009 | |
| WO | WO 2008057898 A2 * | 5/2008 | H04L 27/26 |

*Primary Examiner* — Christopher M Brandt
(74) *Attorney, Agent, or Firm* — Lee, Hong, Degerman, Kang & Waimey

(57) ABSTRACT

The present invention relates to a method for transmitting control information in a multi-cell based mobile communication system, the method comprising: extracting information on a fractional frequency reuse (FFR) pattern that represents whether terminal transmission power for a plurality of frequency resource groups is boosted to apply uplink fractional frequency reuse (UL FFR) to a particular cell; and broadcasting power control information that is configured separately by each of the plurality of frequency resource groups based on the extracted FFR pattern.

12 Claims, 8 Drawing Sheets

(56) References Cited

U.S. PATENT DOCUMENTS

| | | | |
|---|---|---|---|
| 2009/0061778 A1* | 3/2009 | Vrzic et al. | 455/62 |
| 2009/0069026 A1* | 3/2009 | Cho et al. | 455/450 |
| 2009/0225714 A1* | 9/2009 | Kim et al. | 370/329 |
| 2009/0245197 A1* | 10/2009 | Ma et al. | 370/330 |
| 2009/0310698 A1* | 12/2009 | Agarwal et al. | 375/267 |
| 2010/0034157 A1* | 2/2010 | Stolyar et al. | 370/329 |
| 2010/0067455 A1* | 3/2010 | Lee et al. | 370/329 |
| 2010/0103906 A1* | 4/2010 | Montojo et al. | 370/335 |
| 2010/0105406 A1* | 4/2010 | Luo et al. | 455/452.2 |
| 2010/0119071 A1* | 5/2010 | Tsai et al. | 380/268 |
| 2010/0165942 A1* | 7/2010 | Liao et al. | 370/329 |
| 2010/0173637 A1* | 7/2010 | Damnjanovic et al. | 455/447 |
| 2010/0248728 A1* | 9/2010 | Sun et al. | 455/450 |
| 2011/0002279 A1* | 1/2011 | Yang et al. | 370/329 |
| 2011/0003598 A1* | 1/2011 | Ma et al. | 455/452.1 |
| 2011/0070911 A1* | 3/2011 | Zhang et al. | 455/509 |
| 2011/0092209 A1* | 4/2011 | Gaal et al. | 455/436 |
| 2011/0103506 A1* | 5/2011 | Moon et al. | 375/267 |

* cited by examiner

Cell edge user:

Inner user

UL FFR-BASED SIGNAL TRANSMISSION METHOD

CROSS-REFERENCE TO RELATED APPLICATIONS

This application is the National Stage filing under 35 U.S.C. 371 of International Application No. PCT/KR2010/005616, filed on Aug. 24, 2010, which claims the benefit of earlier filing date and right of priority to Korean Application No. 10-2010-0081371, filed on Aug. 23, 2010, and also claims the benefit of U.S. Provisional Application Ser. Nos. 61/310,291, filed on Mar. 4, 2010, 61/239,010, filed on Sep. 1, 2009, and 61/237,703, filed on Aug. 28, 2009, the contents of which are all incorporated by reference herein in their entirety.

TECHNICAL FIELD

The present invention relates to a mobile communication system, and more particularly, to a method and apparatus for transmitting a signal in a mobile communication system using a fractional frequency reuse.

BACKGROUND ART

Fractional frequency reuse is one of methods for increasing the number of channels per unit area in a cellular system. Since strength of radio wave gets weaker in proportion to an increasing distance, inter-radio wave interference becomes insignificant in a place over a predetermined distance, whereby the same frequency channel is usable. Using such a principle, it may be able to raise a subscriber volume considerably in a manner of using the same frequency in several areas simultaneously. This efficient frequency utilization is called a frequency reuse. A unit for dividing an area is called a cell (e.g., a mobile communication cell) and a frequency channel switching between cells to maintain a call is called a handoff. And, a frequency reuse technology is essential to an analog cellular mobile communication system. A frequency reuse rate is one of parameters indicating frequency efficiency in a cellular system. In particular, the frequency reuse rate is a value resulting from dividing a total number of cells (sectors), which use the same frequency simultaneously in a multi-cell structure, by the total number of cells (sectors) of the whole multi-cell structure.

A frequency reuse rate of 1G system (e.g., AMPS) is smaller than 1. For instance, in 7-cell frequency reuse, a frequency reuse rate is 1/7. A frequency reuse rate of 2G system (e.g., CDMA, TDMA, etc.) is better than that of 1G system. For instance, a frequency reuse rate of FDMA-TDMA combined GSM may reach a range of ¼ to ⅓. In case of 2G CDMA system or 3G WCDMA system, since a frequency reuse rate may reach 1, efficiency of spectrum is increased and a network arrangement cost is lowered.

When all sectors in one cell and all cells in one network use the same frequency, a frequency reuse rate can become 1. Yet, if a frequency reuse rate becomes 1 in a cellular network, it means that signal reception performance for users at a cell edge is lowered by the interference with a neighbor cell.

In OFDMA, since a channel is divided by a subchannel unit, a signal is carried on a subchannel and all channels are not used like 3G (e.g., CDMA 2000, WCDMA, etc.). Using this feature, it may be able to simultaneously enhance both throughputs of users at a cell center and users at a cell edge. In particular, since a central area of a cell is located close to a base station, it is safe from co-channel interference from a neighbor cell. Hence, inner users at the cell center are able to use all available subchannels. However, the users at the cell edge may use the available subchannels in part only. On a cell edge between cells adjacent to each other, a frequency is allocated to enable the cells to use different subchannels, respectively. This scheme is called a fractional frequency reuse (FFR).

DISCLOSURE OF THE INVENTION

Technical Tasks

In order to apply a fractional frequency reuse (FFR), each base station uses a different frequency band on a subchannel. For instance, since some tones are used by all sectors, a corresponding frequency reuse rate is 1. Yet, since different ⅓ of tones are used by each sector, a corresponding frequency reuse rate is ⅓. Such a frequency reuse rate may be set in various ways in accordance with network settings. FFR scheme is categorized into a hard FFR scheme and a soft FFR scheme. In the hard FFR scheme, some tones are not used at all. Yet, in the soft FFR scheme, some tones are used with low power. Thus, FFR can be configured in various ways in accordance with the settings. Therefore, in order to effectively manage and operate FFR for real application, control information on a configuration of FFR should be shared between base stations and/or mobile stations.

Accordingly, the present invention is directed to substantially obviate one or more problems due to limitations and disadvantages of the related art. First of all, an object of the present invention is to provide a method of efficiently using FFR in a multi-cell based mobile communication system.

Another object of the present invention is to provide a method of transmitting FFR configuration information by reducing signaling overhead in the course of providing information on a configuration of FFR to a base station and/or a mobile station in a mobile communication system.

A further object of the present invention is to provide a method of deriving a transmission power level in each frequency resource group for FFR application using a power control parameter broadcasted from a base station.

Technical tasks obtainable from the present invention are non-limited the above mentioned effect. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, in transmitting control information in a multi-cell based mobile communication system, a control information transmitting method according to one embodiment of the present invention includes the steps of deriving information on a fractional frequency reuse (FFR) pattern indicating whether a mobile station transmission power for a plurality of frequency resource groups is boosted to apply uplink fractional frequency reuse (UL FFR) to a specific cell and broadcasting power control information configured separately for each of the plurality of frequency resource groups based on the derived FFR pattern.

The FFR pattern information according to one embodiment of the present invention includes index information of the FFR pattern applied to the specific cell.

In this case, an index of the FFR pattern may be determined using a formula as follows:

$$K = \text{SegmentID} + 1 \qquad \text{<Formula>}$$

In Formula, e the k indicates the index of the FFR pattern and the SegmentID indicates identification information of a specific segment region.

The control information transmitting method according to one embodiment of the present invention further includes the step of transmitting FFR configuration information for FFR application and the FFR configuration information includes information on at least one of a number of the frequency resource groups, a bandwidth of the frequency resource group, a component ratio between the frequency resource groups and a fractional frequency reuse rate.

To further achieve these and other advantages and in accordance with the purpose of the present invention, in a multi-cell based mobile communication system, a method of transmitting a signal of a mobile station according to another embodiment of the present invention includes the steps of deriving pattern information of a fractional frequency reuse (FFR) applied to a specific cell using segment identification information of a preamble received from a base station, receiving power control information configured separately for each of a plurality of frequency resource groups determined in accordance with the FFR pattern from the base station, and transmitting a signal using a specific power level in a specific resource region based on the FFR pattern information and the power control information, wherein the specific cell comprises a cell at which the mobile station is located or a different cell adjacent to a cell to which the mobile station belongs.

The FFR pattern information according to another embodiment of the present invention may include index information of the FFR pattern applied to the specific cell.

In this case, an index of the FFR pattern may be determined using a formula as follows:

$$K = \text{SegmentID} + 1 \qquad \text{<Formula>}$$

In Formula, the k indicates the index of the FFR pattern and the SegmentID indicates identification information of a specific segment region derived using the preamble.

The signal transmitting method according to another embodiment of the present invention further includes the step of receiving FFR configuration information for FFR application from the base station, and the FFR configuration information may include information on at least one of a number of the frequency resource groups, a bandwidth of the frequency resource group, a component ratio between the frequency resource groups and a fractional frequency reuse rate.

To further achieve these and other advantages and in accordance with the purpose of the present invention, in a multi-cell based mobile communication system, a base station according to another embodiment of the present invention includes: a transmitting module configured to transmit a radio signal;

a receiving module configured to receive a radio signal; and a processor configured to derive information on a fractional frequency reuse (FFR) pattern indicating whether a mobile station transmission power for a plurality of frequency resource groups is boosted to apply uplink fractional frequency reuse (UL FFR) to a specific cell, the processor configured to control the transmitting module to broadcast power control information configured separately for each of the plurality of frequency resource groups based on the derived FFR pattern, the processor configured to derive the FFR pattern information using segment identification information.

To further achieve these and other advantages and in accordance with the purpose of the present invention, in a multi-cell based mobile communication system, a mobile station according to a further embodiment of the present invention may include a transmitting module configured to transmit a radio signal, a receiving module configured to receive a radio signal, and a processor configured to derive pattern information of a fractional frequency reuse (FFR) applied to a cell at which the mobile station is located or a different cell adjacent to a cell to which the mobile station belongs using segment identification information of a preamble received from a base station via the receiving module, wherein the receiving module receives power control information configured separately for each of a plurality of frequency resource groups based on the derived FFR pattern from the base station and wherein the processor controls a signal to be transmitted using a specific power level in a specific resource region based on the FFR pattern information and the power control information.

Effects of the Invention

Accordingly, the present invention may provide the following effects and/or advantages.

First of all, FFR can be efficiently operated and managed in a mobile communication system.

Secondly, in the course of providing information on a configuration of FFR to a base station and/or a mobile station, since each mobile station is able to derive information on FFR frequency resource pattern using a segment ID broadcasted via broadcast information, it is able to control information signaling overhead for FFR application.

Thirdly, a transmission power level in each frequency resource group is derived in applying FFR using a power control parameter broadcasted from a base station, whereby power level adjustment can be easily performed in case of inter-cell shift.

Effects obtainable from the present invention are non-limited the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

Reference will now be made in detail to the preferred embodiments of the present invention, examples of which are illustrated in the accompanying drawings. The detailed description of the present invention disclosed together with the accompanying drawings intends to describe configurations, operations and other features of the present invention. And, embodiments described in the following include examples of applying the technical features of the present invention to a multi-cell based mobile communication system.

Figure 1:
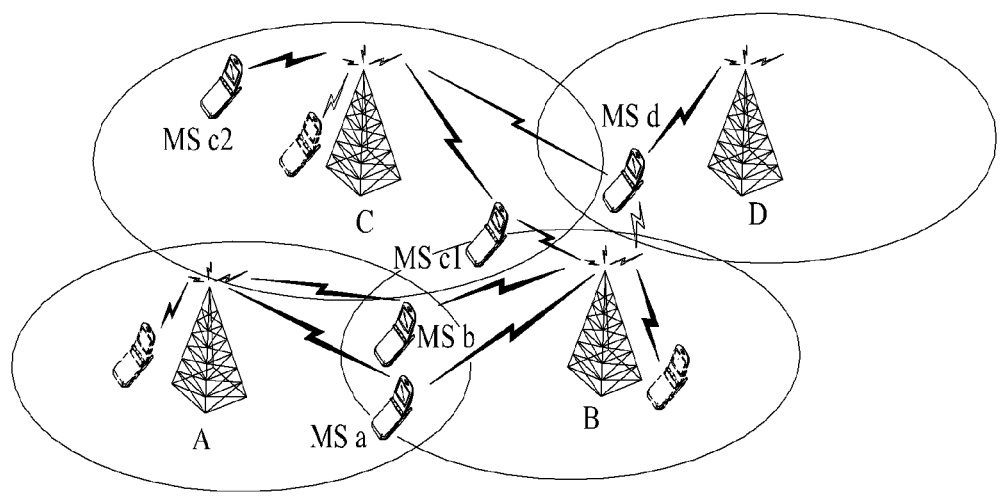
FIG. 1 shows one example that a specific mobile station receives a service from at least one base station in accordance with a location within a cell in a multi-cell environment.
Figure 1:
Figure 1:

FIG. 1 shows one example that a specific mobile station receives a service from at least one base station in accordance with a location within a cell in a multi-cell environment.

Referring to FIG. 1, 'MS a' indicates a mobile station belonging to an edge of a cell A and is provided with a service from the cell A. Yet, since the MS a belongs to an edge of a cell B as well, it may be affected by the cell B. Likewise, 'MS b' indicates a mobile station belonging to an edge of the cell B and is provided with a service from the cell B. Yet, since the MS b belongs to an edge of the cell A as well, it may be affected by the cell A. And, 'MS c1' indicates a mobile station belonging to an edge of a cell C and is provided with a service from the cell C. Yet, since the MS c1 belongs to an edge of the cell B as well, it may be affected by the cell B. Moreover, 'MS c2' indicates a mobile station belonging to an edge of the cell C and is provided with a service from the cell C. Yet, since the MS c2 belongs to an edge of another adjacent cell (not shown in the drawing) as well, it may be affected by the adjacent cell. Besides, 'MS d' indicates a mobile station belonging to an edge of a cell D and is provided with a service from the cell D. Yet, since the MS b belong to each of the boundaries of the cell B and the cell C as well, it may be affected by each of the cell B and the cell C.

In particular, the MS a, the MS b, the MS c1, the MS c2 and he MS d are mobile stations and are simultaneously affected by an adjacent cell. Therefore, data throughput of a service received by each of the mobile stations may be reduced due to co-channel interference attributed to the adjacent cell. On the other hand, the inner users shown FIG. 1 are not affected by the adjacent cell.

Figure 2:
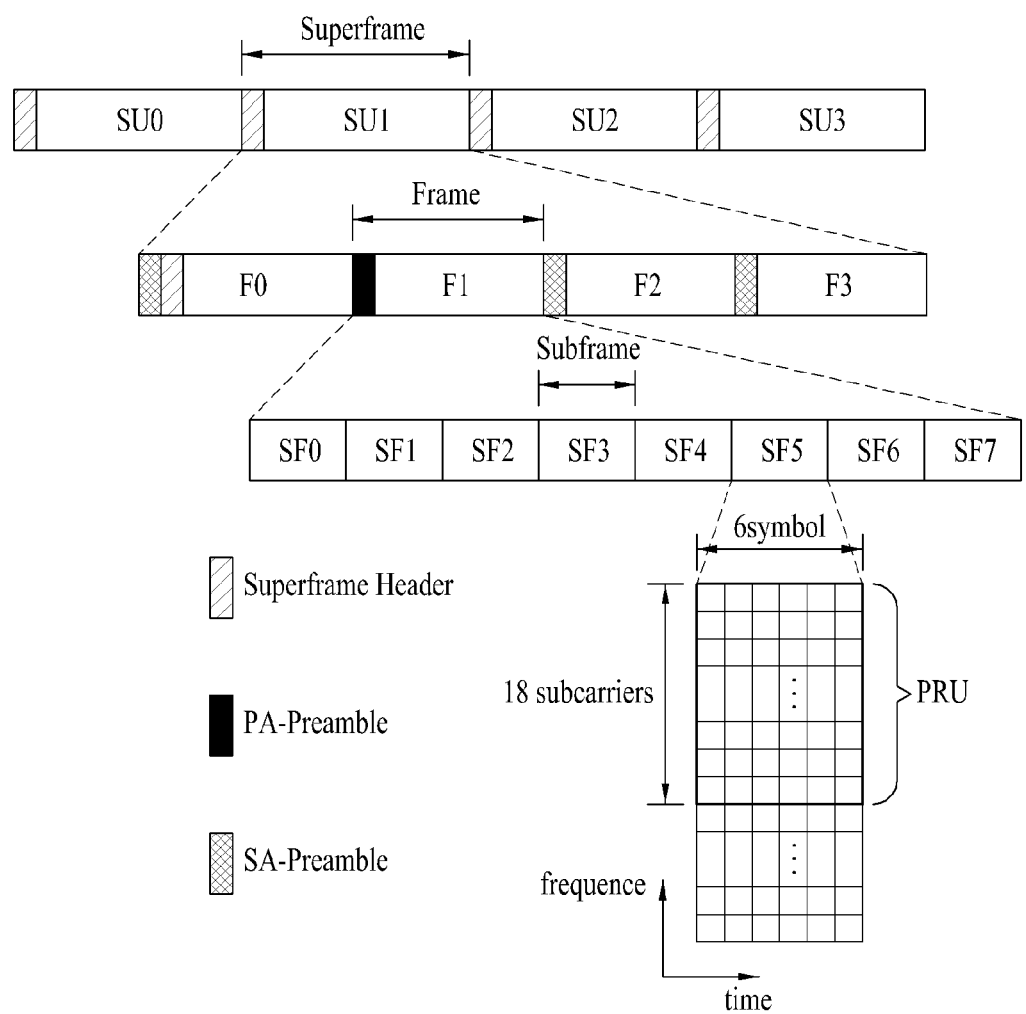
FIG. 2 is a diagram for one example of a frame structure generally used in IEEE 802.16m system.

FIG. 2 is a diagram for one example of a frame structure generally used in IEEE 802.16m system.

Referring to FIG. 2, a radio frame structure includes 20 ms superframes SU0 to SU3, each of which supports 5 MHz, 8.75 MHz, 10 MHz or 20 MHz. The superframe includes 4 5 ms frames F0 to F3 in equal size and starts with a superframe header (SFH).

The superframe header, as shown in FIG. 2, may be situated within a $1^{st}$ subframe of each of the superframes and use at least 5 OFDM symbols. The superframe header is used to efficiently transmit a system parameter essential to network entry and system configuration information to mobile stations. And, the superframe header may include a physical broadcast channel for broadcasting general broadcast information or advanced broadcast information (ABI).

The superframe header includes one primary superframe header (P-SFH) and three secondary superframe headers (S-SFHs). The P-SFH is transmitted in each superframe. The S-SFH is transmitted in each superframe and may be repeatedly transmitted in two consecutive superframes.

An advanced preamble is transmitted in a superframe. A preamble transmitted in one superframe may be categorized into PA (primary advanced) preamble and SA (secondary advanced) preamble. The PA preamble is used to transmit information on a system bandwidth and a carrier configuration and is situated at a $1^{st}$ symbol of a $2^{nd}$ frame of the superframe. The SA preamble is used to transmit such information as segment ID and the like and is situated at a $1^{st}$ symbol of each of the rest of the frames except a $2^{nd}$ frame of the superframe.

Each of the frames constructing the superframe includes 8 subframes SF0 to SF7. Each of the subframes includes a plurality of OFDM symbols in time domain and a plurality of subcarriers in frequency domain. The OFDM symbol may be named OFDMA symbol, SC-FDMA symbol or the like in accordance with a multiple access scheme. The number of OFDM symbols included in one subframe may be variously changed into 5 to 7 in accordance with a channel bandwidth, a CP length or the like. In accordance with the number of OFDM symbols included in a subframe, a type of the subframe may be defined. For instance, a type-1 subframe may be defined as including 6 OFDM symbols, a type-2 subframe may be defined as including 7 OFDM symbols, a type-3 subframe may be defined as including 5 OFDM symbols, and a type-4 subframe may be defined as including 9 OFDM symbols. One frame includes all subframes of the same type or may include subframes of different types.

The above structure described with reference to FIG. 2 is just exemplary. Hence, a length of a superframe, the number of frames included in a superframe, the number of subframes included in a frame, the number of OFDMS symbols included in a subframe, a parameter of OFDMA symbol and the lime may be changed in various ways. For instance, the number of subframes included in a frame may be changed variously in accordance with a channel bandwidth, a length of CP (cyclic prefix) or the like.

Figure 3:
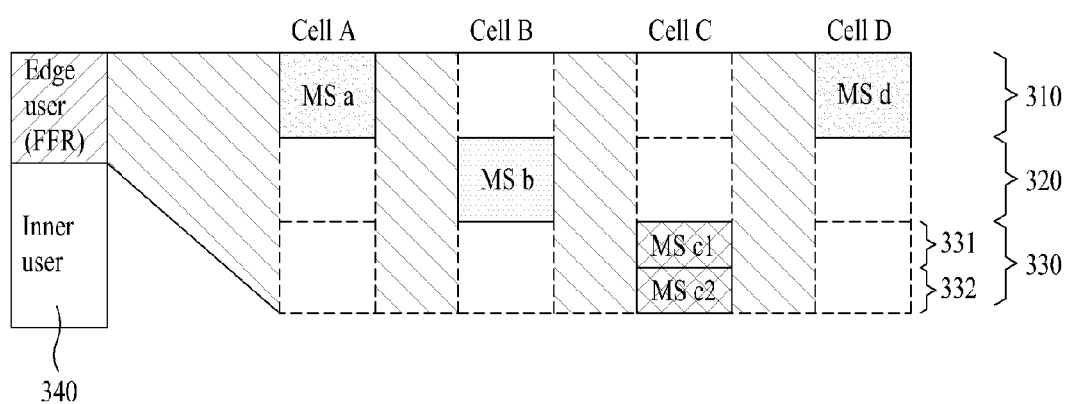
FIG. 3 shows one example of allocating a frequency resource in accordance with hard FFR.

FIG. 3 shows one example of a configuration of hard FFR, to which an embodiment of the present invention is applicable, based on a plurality of the cells and mobile stations shown in FIG. 1.

Referring to FIG. 3, total frequency resources may be divided/classified on various bases in association with FFR application. First of all, total frequency resources (or band) usable by each cell can be mainly divided into 2 regions. In particular, a $1^{st}$ region is a frequency resource for an edge user (or edge mobile station) located at an edge with an adjacent cell and a $2^{nd}$ region is a frequency resource for an inner cell user (or inner mobile station) [340].

According to FFR scheme, a frequency region for an edge user may be divided into several smaller regions. FIG. 3 shows one example a case that the FFR scheme is FFR ⅓ (i.e., this indicates a frequency reuse rate associated with FFR is ⅓). In case of FFR ⅓, the frequency region for the edge user is divided into 3 regions 310, 320 and 330 and each cell provides the edge user with a service using one of the 3 regions only. In this specification, the region is named a frequency resource group or a frequency partition (FP), which may be interchangeably usable.

Frequency resource groups may be classified in accordance with a usage related to FFR. In FIG. 3, total frequency resource groups available for a cell may be classified into 3 frequency bands in accordance with the usage related to FFR. A $1^{st}$ frequency band is a frequency resource group actually used for an edge user by a corresponding cell among frequency resource groups and is named 'FFR_band_edge'. A $2^{nd}$ frequency band is a frequency resource group not used for an edge user by a corresponding cell among frequency resource groups and is named 'FFR_band_inner'. And, a 3$^{rd}$ frequency band is a frequency resource group for an inner user is named 'inner_band'. Regarding a cell A, FFR_band_edge is indicated by 310, FFR_band_inner is indicated by 320 or 330, and inner-band is indicated by 340.

Regarding the example sown in FIG. 3, since each cell uses ⅓ of the frequency resources allocated for an edge user, a frequency reuse rate for a cell edge user is ⅓. On the other hand, since each cell uses all the frequency resources allocated for an inner user, a frequency reuse rate for the inner user is 1. In the following description, a frequency reuse rate for an edge user shall be named 'fractional frequency reuse rate'. For instance, if a fractional frequency reuse rate is ⅔, the number of frequency resource groups allocated for an edge user is 3 and each cell provides an edge user with a service using two of the three frequency resource groups only.

In the following description, in case that a fractional frequency reuse rate is ⅓, a method of performing FFR using allocated frequency resource group is explained with reference to FIG. 3.

First of all, in FIG. 1, a partial region of the cell A overlaps with a partial region of the cell B or the cell C. Hence, referring to FIG. 3, the specific frequency resource 310 allocated to the cell A may not be used by the cell B or the cell C. Likewise, in FIG. 1, a partial region of the cell B overlaps with a partial region of the cell A, the cell C or the cell D. Hence, referring to FIG. 3, the specific frequency resource 320 allocated to the cell B may not be used by the cell A, the cell C or the cell D. Likewise, in FIG. 1, a partial region of the cell C overlaps with a partial region of the cell A, the cell B or the cell D. Hence, referring to FIG. 3, the specific frequency resource 330 allocated to the cell B may not be used by the cell A, the cell B or the cell D. Likewise, in FIG. 1, a partial region of the cell D overlaps with a partial region of the cell B or the cell C. Hence, referring to FIG. 3, the specific frequency resource 310 allocated to the cell D may not be used by the cell B or the cell C. Moreover, since the cell A does not overlap with the cell D at all in FIG. 1, the same frequency resource 310 may be allocated to each of the cell A and the cell D.

Therefore, the specific frequency resource 310 allocated to the cell A can be entirely allocated to the MS a at the edge of the cell A. And, the specific frequency resource 320 allocated to the cell B can be entirely allocated to the MS b at the edge of the cell B. Likewise, the specific frequency resource 310 allocated to the cell D can be entirely allocated to the MS d at the edge of the cell D. Meanwhile, the MS c1 and the MS c2 exist at the edge of the cell C. Hence, a partial frequency resource 331 of the specific frequency resource allocated to the cell C can be allocated to the MS c1 and a partial frequency resource 332 of the specific frequency resource allocated to the cell C can be allocated to the MS c2.

As mentioned in the foregoing description, the total frequency resources allocated to each cell can be divided into at least one frequency resource group (e.g., fractional frequency reuse rate: ⅓) and a frequency resource group (e.g., reuse rate: 1) for an inner user. Thus, if a service is provided to an edge user (or mobile station) using FFR, it may exist in various forms by depending on h how the total frequency resources allocated to the corresponding cell are divided. Therefore, if each cell is cooperatively aware of the method of dividing the total frequency resources, FFR efficiency can be enhanced in a manner of avoiding interference with a cell edge user.

Figure 4:
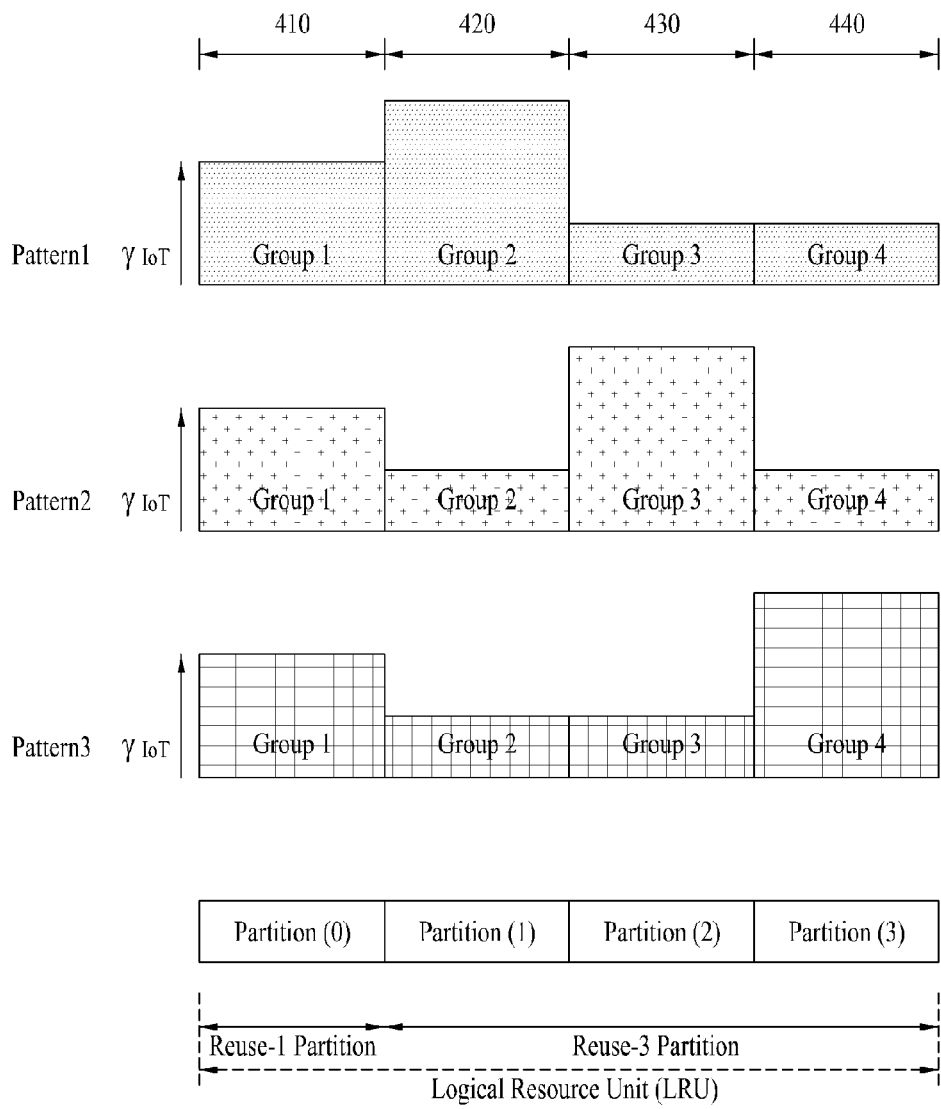
FIG. 4 shows one implemented example of soft FFR according to one embodiment of the present invention.

FIG. 4 shows one implemented example of soft FFR according to one embodiment of the present invention.

Referring to FIG. 4, total frequency resources allocated to each sector are divided into 4 frequency resource groups Group 1 to Group 4 (i.e., 410, 420, 430 and 440). The Group 1 is a frequency resource group for a mobile station within a cell and corresponds to the former reference number 340 shown in FIG. 3. The Groups 2 to 4 are frequency resources for edge mobile stations located at cell edge and correspond to the former reference numbers 310, 320 and 330 shown in FIG. 3, respectively. In FIG. 4, Pattern 1, Pattern 2 and Pattern 3 correspond to a sector A, a sector B and a sector C, indicate FFR patterns of the sectors, and correspond to the former cells A to C shown in FIG. 3, respectively. In particular, the FFR pattern can be used independently for each cell or sector.

In this specification, a cell or sector is provided to indicate a basic network element that operates FFR. In aspect of providing a service to an edge user (or an edge mobile station) by operating FFR, the cell and the sector may be interchangeably usable.

As mentioned in the foregoing description, one implemented example of the soft FFR exemplarily shown in FIG. 4 is similar to that of the hard FFR shown in FIG. 3. Yet, the soft FFR shown in FIG. 4 may be able to compensate for the reduction of the bandwidth efficiency due to the unused frequency resource groups (e.g., the frequency resource group 320 and the frequency resource group 330 in the cell A shown in FIG. 3) in the hard FFR shown in FIG. 3.

In FIG. 4, in case of applying the FFR pattern 1, the Group 1 is a frequency resource group for an inner cell mobile station and has a frequency reuse rate set to 1. Each of the Groups 2 to 4 is a frequency resource group for an edge mobile station and has a frequency reuse rate set to ⅓. Hence, the sector A applying the FFR pattern 1 provides a service to the edge mobile station using one frequency resource group (FFR_band_edge) 420 among the groups 2 to 4 only. The 2 remaining frequency resource groups (FFR_band_inner 430 and 440 are not used for the edge mobile station. On the other hand, the Group 1 is a frequency resource group (inner_band) allocated for a mobile station within the sector A and has a frequency reuse rate set to 1.

Unlike the hard FFR shown in FIG. 3, the sector A, which uses the FFR pattern 1, provides a service to an inner mobile station of the sector A using the frequency resources (FFR_band_inner) corresponding to the Group 2 and the Group 3 in addition. To this end, the sector A sets a low power level for the frequency resource corresponding to each of the Group 3 and the Group 4 to prevent interference with a mobile station existing at the edge of each of the sector 2 and the sector 3 from occurring. In particular, in the soft FFR, the frequency resources are grouped and a power level of each of the groups is differentiated in accordance with a usage of the corresponding group to raise frequency efficiency.

In order to efficiently manage and operate FFR in accordance with user distribution within a cell (or sector), it may be able to consider an adaptive FFR scheme of flexibly adjusting a bandwidth of each frequency resource group allocated for FFR or a component ratio of each frequency resource group. To this end, each base station and/or mobile station should be aware of information relevant to the bandwidth of each frequency resource group or the component ratio of each frequency resource group.

Yet, in case that a base station determines and broadcasts the component ratio of each frequency resource group for the FFR operation and FFR pattern applicable to each sector of a corresponding cell to each cell, signaling overhead may increase.

Therefore, the present invention intends to propose a method of operating FFR to enable a mobile station to adaptively determine FFR pattern applicable per sector for the efficient FFR operation in accordance with a cell environment. In particular, according to one embodiment of the present invention, information transmitted to each cell by a base station to apply FFR in uplink is configured implicitly, whereby FFR can be efficiently operated by reducing signaling overhead.

Figure 5:
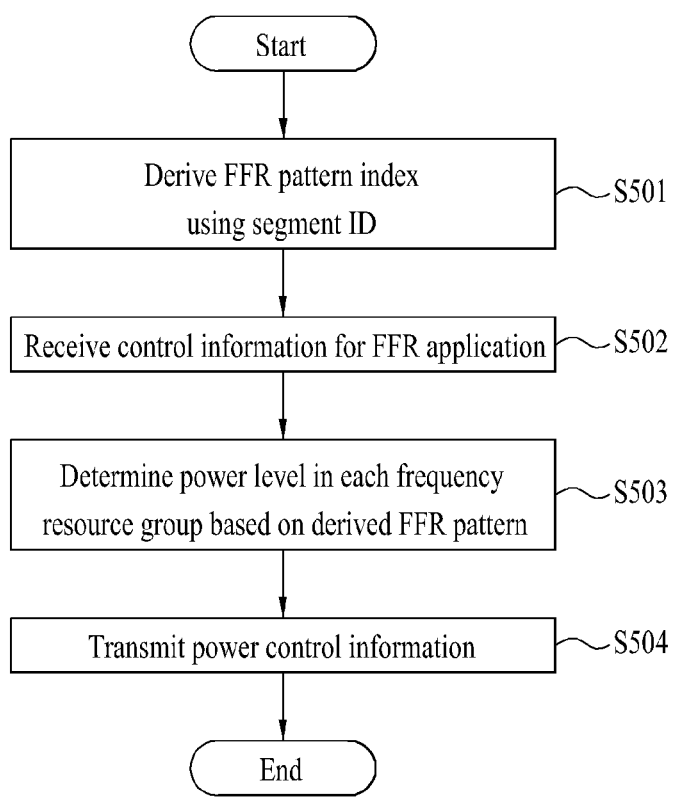
FIG. 5 is a flowchart for one example of a process for applying soft FFR according to one embodiment of the present invention.

FIG. 5 is a flowchart for one example of a process for applying soft FFR according to one embodiment of the present invention.

Generally, in a multi-cell based mobile communication system, each base station may be able to determine a transmission power level for each frequency resource group in a manner of configuring a frequency resource group per sector (or segment) of each cell in order to apply YL FFR (uplink fractional frequency reuse) of a cell that provides a service.

To this end, referring to FIG. 5, a base station determines FFR pattern indicating that power boosting is performed in a prescribed frequency resource group of a frequency resource region allocated to each cell in order to apply UL FFR [S501]. An index of FFR pattern for a specific cell can be determined using segment identifier information (segment ID) as shown in Formula 1.

$$k = \text{SegmentID} + 1 \quad \text{[Formula 1]}$$

In Formula 1, 'k' is FFR pattern index and is derived by calculating a predetermined value for segment ID. Yet, even if the derived FFR pattern index is identical, a form of a frequency resource group applicable to a corresponding segment is different in accordance with a value of FPCT.

For instance, when a frequency partition count (FPCT) is 4, as shown in FIG. 4, one of 3 FFR patterns (Pattern 1 to Pattern 3) is selected per sector configuring a cell to determine whether a power boosting is performed in a prescribed frequency resource group in accordance with a segment.

For another instance, when FPCT is 3, if a size of a frequency resource group $FP_3$ corresponding to Group 4 is greater than 0, it may be able to apply the same FFR pattern by excluding a frequency resource group $FP_0$ shown in FIG. 4. In this case, the number of frequency resource groups for a corresponding cell becomes 3, and FFR is configured in a manner that a power boosting is performed in a specific frequency resource group and that the rest of frequency resources use a minimum power level.

Subsequently, the base station broadcasts the control information for the FFR application into each cell area [S502]. The base station generates control information required for UL FFR configuration based on such a measurement result as an interference state of each frequency resource group on a whole system band and the like to support the UL FFR. In this case, the control information may include information on at least one of the number of frequency resource groups in accordance with FFR pattern applicable to each cell, a bandwidth of a frequency resource group, a component ratio between frequency resource groups and a fractional frequency reuse rate.

The control information is carried into the cell on the secondary-superframe header (S-SFH) described with reference to FIG. 2. In particular, if UFPC (UL frequency partition configuration) information indicating a configuration state of a frequency resource group in uplink is broadcasted by being included in a subpacket of a superframe header, each mobile station located in a cell may be able to obtain information on FFR applied to a segment of the corresponding cell.

Subsequently, the base station determines a UL IoT control parameter (γ IoT) for uplink transmission power in each frequency resource group in accordance with the FFR pattern determined in the step S501 [S503] and then broadcasts it into the cell area [S504]. The UL IoT control parameter (γ IoT) is a cell-common power control parameter carried on AAI_SCD (advanced air interference_system configuration descriptor) message and is used for ULPC (UL power control) based on a cell-specific fractional frequency reuse pattern. And, FFR division size may be represented using the UL IoT control parameter (γ IoT) for each frequency resource group.

If FPCT=4, as shown in FIG. 4, a base station configures γ IoT, which can be discriminated for each frequency resource group, with prescribed bits and then broadcasts the configured γ IoT. For instance, when the number of frequency resource groups is 4, if 4 bits are allocated to the power control parameter for each of the groups, power control information is configured with 2 bytes and then transmitted. Having received the γ IoT, each mobile station within a cell can obtain a transmission power level in a different area of the corresponding cell as well as a transmission power level in an area in which the mobile station is located.

Thus, if a base station broadcasts the power control information in each frequency resource group in accordance with FFR pattern to support UL FFR, a mobile station located at an edge of a corresponding cell is able to perform uplink signaling by mitigating an effect of interference with another cell based on the received control information and the like.

Meanwhile, in case of determining FFR pattern using segment ID according to the aforementioned embodiment of the present invention, even if a base station does not signal pattern information separately, a mobile station may be able o derive FFR pattern information applied to a different cell.

Figure 6:
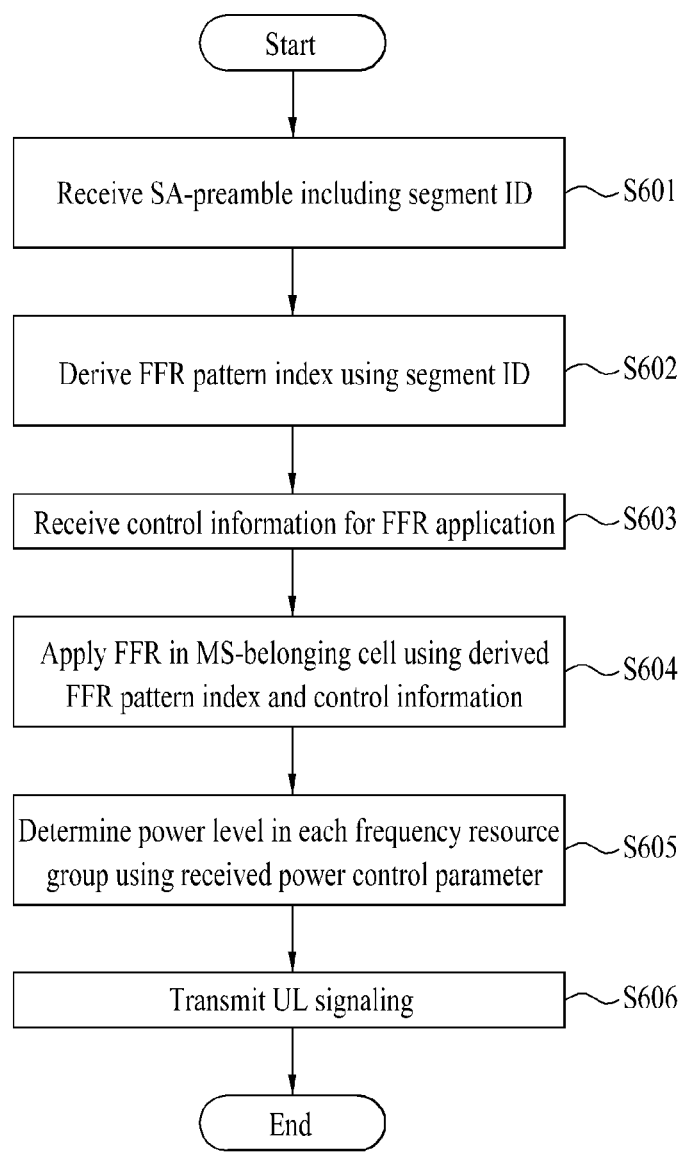
FIG. 6 is a flowchart for another example of a process for applying soft FFR according to one embodiment of the present invention.

FIG. 6 is a flowchart for another example of a process for applying soft FFR according to one embodiment of the present invention.

Referring to FIG. 6, a mobile station receives SA-preamble broadcasted from a base station in accordance with a prescribed period and also receives segment ID of a corresponding cell, which is carried on the SA-preamble [S601]. As mentioned in the foregoing description with reference to FIG. 2, the SA-preamble is carried on a $1^{st}$ symbol of a specific frame in a superframe. Regarding carriers constructing the SA-preamble, for example, in case that one cell is constructed with 3 segments or less, each of the segments uses SA-preamble constructed with a random one of 3 available carrier sets. In particular, segments 0 to 2 use SA-preamble carrier sets 0 to 2, respectively.

Using the received segment ID, the mobile station derives cell ID of the corresponding cell, to which the mobile station belongs, and also derives UL FFR pattern index applicable to the corresponding cell [S602]. In particular, each mobile station may be able to obtain FFR pattern information applied to the corresponding cell using Formula 1 without receiving the signaling of separate FFR pattern information from the base station. And, the mobile station may be able to obtain information on a power-boosted specific frequency resource group as well. As segment ID is the information broadcasted via the SA-preamble, since the mobile station is aware of FFR pattern index applied to a different cell as well as the corresponding cell, the mobile station may be able to predict frequency resource groups in the different cell and a power level state of each of the groups.

Subsequently, the mobile station receives control information for FFR application from the base station [S603]. In this case, since the control information is identical to the former control information described with reference to FIG. 5, its details are omitted to avoid redundant description.

Based on the FFR pattern index derived in the step S602 and the control information received in the step S603, the mobile station configures FFR frequency resource use form to apply to the cell to which the mobile station belongs [S604]. For instance, a mobile station belonging to segment 0 uses segment ID to derive that FFR pattern index is 1 and may be then able to use the FFR form of the pattern 1 exemplarily shown in FIG. 4 by synthesizing such information as the number of the frequency resource groups according to 'FPCT=4', a size of each group and the like via the received control information. In case that the mobile station is located within a cell in segment 0, it may be able to use the frequency resource group 1. If the mobile station is located at a cell edge, it may be able to use the frequency resource group 2.

Subsequently, the mobile station receives a power control parameter for each frequency resource group via AAI-SCD message broadcasted by the base station and then determines a power level [S605]. The power control parameter is UL IoT control parameter transmitted in common to cells and is identical to the former parameter described with reference to FIG. 5. For clarity, the description of the power control parameter shall be omitted from the following description.

Subsequently, the mobile station transmits a signal in uplink in accordance with a power level set for a corresponding group by a specific frequency resource group belonging to a specific FFR pattern in accordance with a location within a cell [S606].

As mentioned in the above description with reference to FIG. 6, a method for a base station to implicitly deliver information on FFR pattern to apply to a corresponding segment using segment ID carried on SA-preamble may be applicable to a case of configuring 4 frequency resource groups or less or extending 4 frequency resource groups or more.

Figure 7:
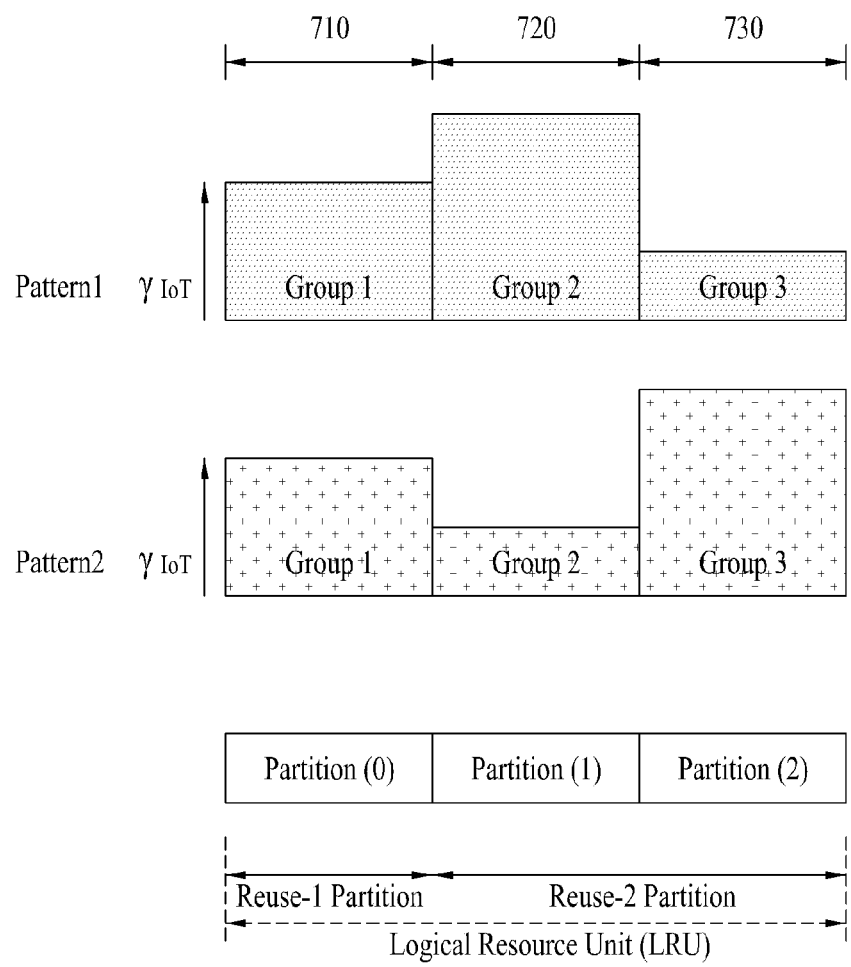
FIG. 7 shows another implemented example of soft FFR according to one embodiment of the present invention.

FIG. 7 shows another implemented example of soft FFR according to one embodiment of the present invention.

Referring to FIG. 7, if FPCT=3 (or FPCT=4 and $FPS_3=0$), there are 3 frequency resource groups and FFR pattern includes Pattern 1 and Pattern 2. For example of FFR Pattern 1, a frequency resource group 1 (inner_band) 710 used by a mobile station belonging inside a cell maintains a predetermined power level and a frequency resource group 2 (FFR_band_edge 2) 720 is used in providing a service to an edge mobile station. A base station determines FFR pattern to apply to each segment and then implicitly delivers the determined FFR pattern to the mobile station inside the cell with segment ID via SA-preamble. The mobile station may be able to obtain information on FFR Pattern 1 and FFR Pattern 2 from the received segment 0 and the received segment 1 using Formula 1. Thereafter, each mobile station receives a control information for FFR application and a power control information in each frequency resource group, which are broadcasted by the base station, and then uses a specific frequency resource region and a transmission power level used for uplink signaling in accordance with a location to which the corresponding mobile station belongs.

If FPCT=2, the frequency resource group 1 710 is excluded in FIG. 7 and FFR pattern is identically applied. In particular, total 2 frequency resource groups 720 and 730 are configured for a specific cell, a power boosting is performed on one of the 2 groups only, and a minimum power level is usable for the other.

Figure 8:
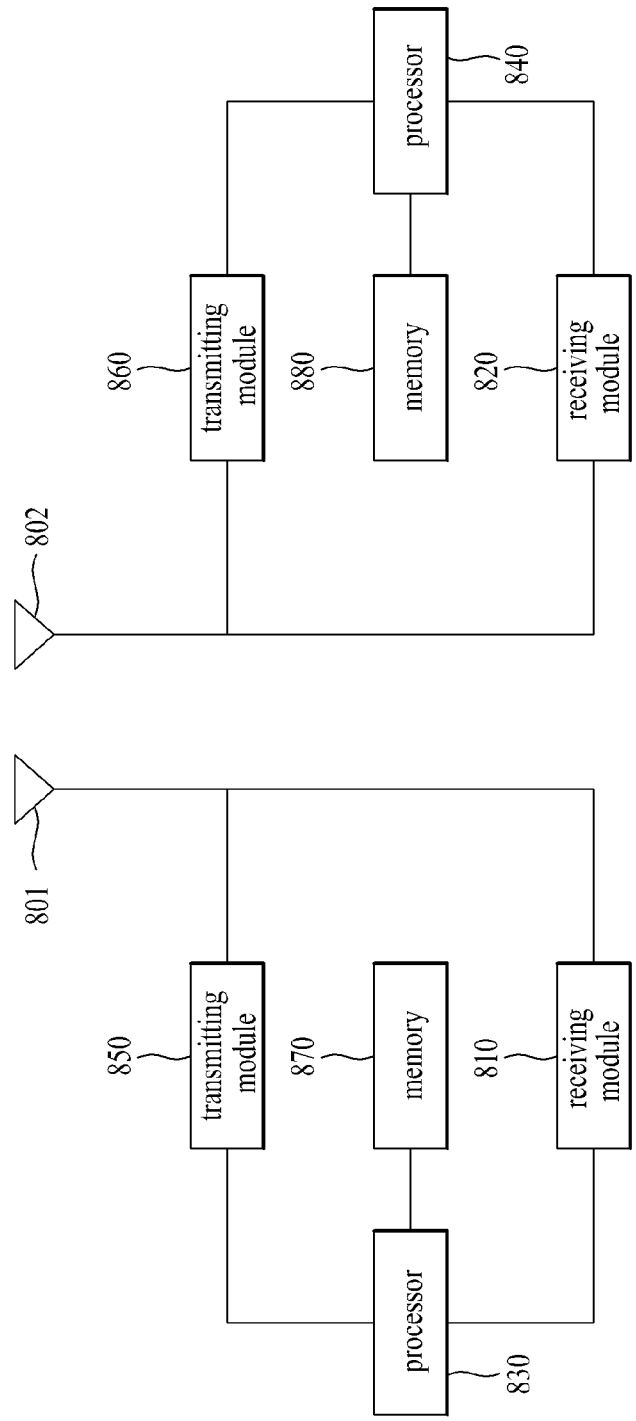
FIG. 8 is a block diagram of a mobile station and a base station according to another embodiment of the present invention to implement the aforementioned embodiments of the present invention.

FIG. 8 is a block diagram of a mobile station and a base station according to another embodiment of the present invention to implement the aforementioned embodiments of the present invention.

First of all, a mobile station works as a transmitter in uplink and is able to work as a receiver in downlink. A base station works as a receiver in uplink and is able to work as a transmitter in downlink. In particular, each of the mobile station and the base station includes a transmitter and a receiver for transmission of information and/or data.

Each of the transmitter and the receiver may include a processor, a module, a part and/or a means for performing embodiments of the present invention. In particular, each of the transmitter and the receiver can include a module (means) for encrypting a message, a module for interpreting the encrypted message, an antenna for transceiving the message and the like.

Referring to FIG. 8, a left part in the drawing indicates a configuration of a transmitter, while a right part in the drawing indicates a configuration of a receiver. In order to perform the aforementioned embodiments of the present invention, the transmitter and the receiver may correspond to a base station and a mobile station for example.

A transmitter/receiver may include an antenna 801/802, a receiving module 810/820, a processor 830/840, a transmitting module 850/860 and a memory 870/880.

The antenna 801/802 includes a receiving antenna and a transmitting antenna. The receiving antenna receives a radio signal from outside and then delivers the received radio signal to the receiving module 810 and 820. And, the transmitting antenna externally transmits a signal generated from the transmitting module 850/860. In case that a multiple-antenna (MIMO) function is supported, at least two antennas can be provided to the mobile station or the base station.

The receiving module 810/820 performs decoding and demodulation on a radio signal received externally via the antenna to reconstruct original data and then delivers the reconstructed original data to the processor 830/840. Alternatively, the receiving module and the antenna may be integrated into a receiving unit configured to receive radio signals instead of being separated from each other as shown in FIG. 8.

The processor 830/840 generally controls overall operations of the transmitter/receiver. In particular, the processor 830/840 may be able to perform a control function, a MAC (medium access control) frame variable control function according to service characteristics and propagation environment, a handover function, an authentication function, an encryption function and the like to perform the above-described embodiments of the present invention.

The transmitting module 850/860 performs prescribed coding and modulation on data, which is scheduled by the processor 830/840 and will be then transmitted externally, and is then able to deliver the coded and modulated data to the antenna. Alternatively, the transmitting module and the antenna may be integrated into a transmitting unit configured to transmit radio signals instead of being separated from each other as shown in FIG. 8.

The memory 870/880 can store programs for processing and control of the processor 830/840 and may be able to perform a function of temporarily storing input/output data (e.g., in case of the mobile station, UL grant allocated by the base station, system information, station identifier (STID), a flow identifier (FID), an action time, region allocation information, frame offset information, etc.). And, the memory 870/880 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

The processor 830 of the transmitter performs overall control operations of the transmitter and may be able to determine a fractional frequency reuse (FFR) pattern for reducing intercell interference in signal transceiving with the receiver in a multi-cell based system. In doing so, as mentioned in the foregoing description with reference to FIG. 6, each base station broadcasts information on the determined FFR pattern in a cell area via segment ID in SA-preamble. Moreover, as mentioned in the foregoing descriptions with reference to FIG. 5 and FIG. 6, control information to apply FFR and UL loT control parameter (γ loT) usable to perform power control in each frequency resource group are configured to be discriminated per frequency resource group and can be broadcasted via AAI-SCD message.

The processor 840 of the receiver performs overall control operations of the receiver as well. And, as mentioned in the foregoing description with reference to FIG. 5, signaling is controlled to be performed using information on UL FFR transmitted explicitly from the transmitter. Moreover, as mentioned in the foregoing description with reference to FIG. 6, FFR pattern information applied to a different cell can be derived using information on UL FFR implicitly transmitted. In the latter case, FFR pattern index used for a specific cell is derived using segment ID and power level information can be then obtained based on the received FFR control information and the received UL loT control parameter.

In particular, the FFR pattern information and power level in a different cell can be known in advance, whereby a power level required for signal transmission can be easily known in case of performing a handover in accordance with an intercell moving.

A mobile station (or terminal) used for embodiments of the present invention may include a low-power RF/IF (radio frequency/intermediate frequency) module. And, the mobile station may further include means, modules, parts and/or the like for performing a controller function, a MAC (medium access control) frame variable control function according to a service characteristic and electric wave environment, a handover function, an authentication and encryption function, a packet modulation/demodulation function for data transmission, a fast packet channel coding function, a real-time modem control function, and the like to implement the above-described embodiments of the present invention.

A base station is able to transmit data received from an upper layer to a mobile station. The base station may include a low-power RF/IF (radio frequency/intermediate frequency) module. And, the base station may further include means, modules, parts and/or the like for performing a controller function, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like to implement the above-described embodiments of the present invention.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention is applicable to various wireless access systems. And, 3GPP ($3^{rd}$ generation partnership project), 3 GPP2 and/or IEEE 802.xx (institute of electrical and electronic engineers 802) system and the like are examples for the various wireless access systems. Embodiments of the present invention are applicable to all technical fields having the various wireless access systems applied thereto as well as the various wireless access systems.

What is claimed is:

1. A method of transmitting control information for uplink (UL) fractional frequency reuse (FFR) of a plurality of frequency partitions in a cell in a multi-cell based mobile communication system, the method comprising:
    determining, by a base station, an FFR pattern among a plurality of FFR patterns, wherein the FFR pattern is determined according to segment identification information of the cell; and
    broadcasting, by the base station, power control information for each of the plurality of frequency partitions, wherein the power control information is used based on the FFR pattern,
    wherein an index of the FFR pattern indicates that an UL transmission power for a frequency partition corresponding to the index is boosted relative to other frequency partitions of the plurality of frequency partitions.

2. The method of claim 1, wherein the index of the FFR pattern is determined by the following formula:

$$k = \text{SegmentID} + 1,$$

wherein k indicates the index of the FFR pattern and SegmentID indicates the segment identification information of the cell.

3. The method of claim 1, further comprising transmitting FFR configuration information for the FFR pattern, wherein the FFR configuration information comprises at least number information of the plurality of frequency partitions, bandwidth information of each of the plurality of frequency partitions, component ratio information between the plurality of frequency partitions or a fractional frequency reuse rate.

4. A method of receiving control information for uplink (UL) fractional frequency reuse (FFR) of a plurality of frequency partitions in a cell in a multi-cell based mobile communication system, the method comprising:
    determining, by a mobile station, an FFR pattern among a plurality of FFR patterns, wherein the FFR pattern is determined according to segment identification information of the cell; and
    receiving power control information for each of the plurality of frequency partitions, wherein the power control information is used based on the FFR pattern,
    wherein an index of the FFR pattern indicates that an UL transmission power for a frequency partition corresponding to the index is boosted relative to other frequency partitions of the plurality of frequency partitions.

5. The method of claim 4, wherein the index of the FFR pattern is determined by the following formula:

$k$=SegmentID+1, wherein k indicates the index of the FFR pattern and SegmentID indicates the segment identification information of the cell.

6. The method of claim 4, further comprising receiving FFR configuration information for the FFR pattern from a base station, wherein the FFR configuration information comprises at least number information of the plurality of frequency partitions, bandwidth information of each of the plurality of frequency partitions, component ratio information between the plurality of frequency partitions or a fractional frequency reuse rate.

7. A base station for transmitting control information for uplink (UL) fractional frequency reuse (FFR) of a plurality of frequency partitions in a cell in a multi-cell based mobile communication system, the base station comprising:
 a transmitting module configured to transmit a radio signal; and
 a processor configured to:
  determine an FFR pattern among a plurality of FFR patterns, wherein the FFR pattern is determined according to segment identification information of the cell; and
  broadcast power control information for each of the plurality of frequency partitions via the transmitting module, wherein the power control information is used based on the FFR pattern,
 wherein an index of the FFR pattern indicates that an UL transmission power for a frequency partition corresponding to the index is boosted relative to other frequency partitions of the plurality of frequency partitions.

8. The base station of claim 7, wherein the index of the FFR pattern is determined by the following formula:

$k$=SegmentID+1, wherein k indicates the index of the FFR pattern and SegmentID indicates the segment identification information of the cell.

9. The base station of claim 7, wherein the processor is further configured to transmit FFR configuration information for the FFR pattern, wherein the FFR configuration information comprises at least number information of the plurality of frequency partitions, bandwidth information of each of the plurality of frequency partitions, component ratio information between the plurality of frequency partitions or a fractional frequency reuse rate.

10. A mobile station for receiving control information for uplink (UL) fractional frequency reuse (FFR) of a plurality of frequency partitions in a cell in a multi-cell based mobile communication system, the mobile station comprising:
 a receiving module configured to receive a radio signal; and
 a processor configured to:
  determine an FFR pattern among a plurality of FFR patterns, wherein the FFR pattern is determined according to segment identification information of the cell; and
  receive power control information for each of the plurality of frequency partitions via the receiving module, wherein the power control information is used based on the FFR pattern,
 wherein an index of the FFR pattern indicates that an UL transmission power for a frequency partition corresponding to the index is boosted relative to other frequency partitions of the plurality of frequency partitions.

11. The mobile station of claim 10, wherein the index of the FFR pattern is determined by the following formula:

$k$=SegmentID+1, wherein k indicates the index of the FFR pattern and SegmentID indicates the segment identification information of the cell.

12. The mobile station of claim 10, wherein the processor is further configured to receive FFR configuration information for the FFR pattern from a base station, wherein the FFR configuration information comprises at least number information of the plurality of frequency partitions, bandwidth information of each of the plurality of frequency partitions, component ratio information between the plurality of frequency partitions or a fractional frequency reuse rate.

* * * * *